UNITED STATES PATENT OFFICE.

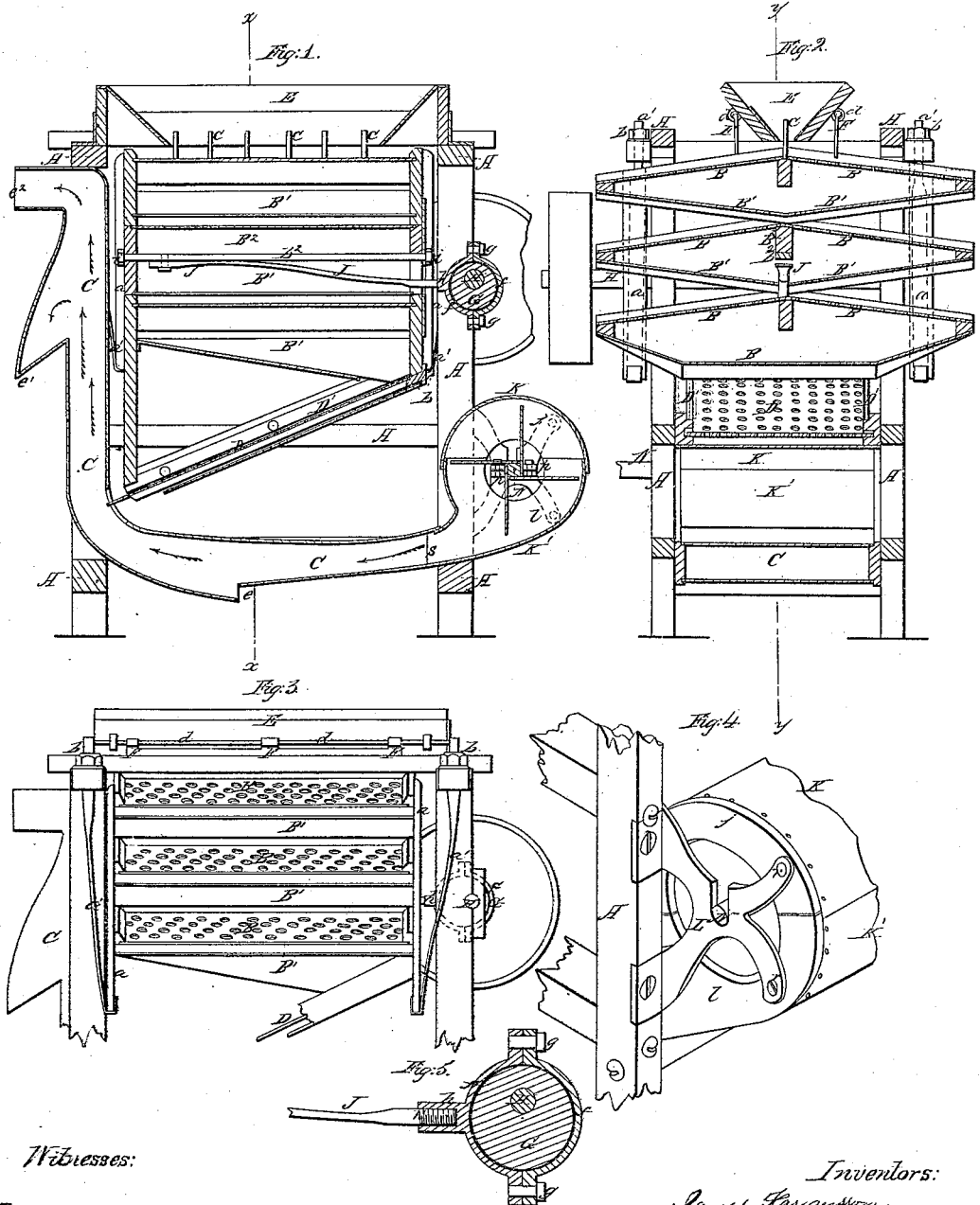

JAMES FARGUSSON, OF DUBUQUE, IOWA, AND CHARLES S. BURT, OF DUNLEITH, ILLINOIS, ASSIGNORS TO JAMES FARGUSSON.

IMPROVEMENT IN GRAIN-SEPARATORS.

Specification forming part of Letters Patent No. 39,093, dated June 30, 1863.

*To all whom it may concern:*

Be it known that we, JAMES FARGUSSON, of Dubuque, in the county of Dubuque and State of Iowa, and CHARLES S. BURT, of Dunleith, State of Illinois, have invented certain new and useful Improvements in Grain-Separators; and we do hereby declare that the following is a full, clear, and exact description thereof, reference being had to the accompanying drawings, making a part of this specification, in which—

Figure 1 is a vertical longitudinal section through the machine, taken in the vertical plane indicated by red line $y\ y$ in Fig. 2. Fig. 2 is a transverse section through the center of the machine, taken in the vertical plane indicated by the red line $x\ x$ marked on Fig. 1. Fig. 3 shows the manner of supporting the riddles. Fig. 4 shows the manner of attaching the fan-box to the frame of the machine, so that it can be removed or replaced at pleasure. Fig. 5 is a section through the eccentric and its strap, with a portion of its rod.

Similar letters of reference indicate corresponding parts in the several figures.

This invention relates to certain new and useful improvements on the grain-separator which formed the subject of Letters Patent bearing date November 5, 1861, to JAMES FARGUSSON, one of the present applicants.

To enable others skilled in the art to make and use our invention, we will proceed to describe its construction and operation.

In the accompanying drawings, A represents the frame of the machine for supporting the riddles, hopper, fan-box, and blast-spouts.

B B are the riddles, which are constructed and arranged as described in my patent of November 5, 1861, with their inclined bottoms B' B', which discharge the grain mixed with its impurities directly upon the ridges of each succeding riddle until all the sticks, straws, &c., are thrown off, when the inclined bottom of the last riddle finally discharges the grain and its finer impurities directly upon the inclined cockle-screen D, from whence the whole are submitted to the action of a blast of air which separates the light wheat, &c., from the good wheat.

In the drawings I have shown the flat inclined riddles, but it will be seen that the surfaces of these riddles may be made either concave or convex without changing the principle of my invention.

The riddle-boxes with their perforated metal riddles are all connected together by means of the perpendicular rods $a\ a\ a\ a$, which separate each riddle-box from the other the required distance apart, and hold the riddle-boxes firmly in their relative positions one with the other. The lower ends of rods or braces $a\ a\ a\ a$ project a short distance below the outer ends of the riddle-boxes, and receive the hooked ends of the spring-suspenders $a'$ $a'\ a'\ a'$, which are hung from the upper part of the main frame A, and attached to this frame or the transverse bars thereof by means of nuts $b$, which are tapped on the ends of the suspenders $a'$. By means of these nuts the riddle-boxes can all be adjusted at once and set in a proper position for obtaining the greatest effect. The cockle-screen frame D' is also connected to the riddles in such a manner that it receives a similar movement to that which is given to the riddles; and instead of securing the screen to its frame as hitherto, I form grooves in the inclined trough or sides of the screen-frame, and slide this frame D' into these grooves like a drawer, and furnish it with a knob, $b'$, so that the screen can be pulled out at pleasure for cleaning or repairing it, and keeping it in good working condition. This drawer-screen D extends longitudinally from the opening in the bottom of the lowermost riddle-box, B, to the blast-opening in the spout C, as shown in Fig. 1 of the drawings, and delivers the riddled wheat into this spout C, where it is acted upon by an upward blast of air from the fan-box and deprived of its light impurities, the clean grain falling down by its superior weight and escaping at $e$, while the light stuff is blown upward and out of the two openings $e'\ e^2$. (Shown in Fig. 1 of the drawings.)

E is the hopper, having an open bottom through which the wheat passes directly upon or along the ridge of the riddles in the uppermost riddle-box, and $c\ c\ c$ are pins which extend from the ridge of the riddles up into the hopper and among the grain, and as these pins vibrate with the riddles they keep up a continuous and uniform feed and prevent the discharge opening from clogging up. Instead of these pins a thin plate or board might be used, which would assist in dividing the feed or flow, so that each side of the riddle or each inclined riddle would receive an equal supply of grain, &c., upon its surface. The hinged plates F F, which are arranged on each side of the hopper E, are intended to operate as spreaders for distributing the grain, after it has fallen from the hopper on the ridge of the first riddles, over the surfaces of these riddles in an even manner. These plates are supported by and hinged to longitudinal rods $d\ d$, (shown in Fig. 3 of the drawings,) which are connected at their ends to the transverse braces of the frame A. The lower edges of the plates F F are parallel with the surfaces of their respective riddles, and these edges allow a proper quantity of grain to pass under them, but prevent the grain from flowing too rapidly, and check it from flying or bounding over the outer edges of the riddles. By this arrangement it will be seen that the grain is subjected to the riddling action as soon as it falls upon the riddles, and that no good grain will escape. The hopper E, as well as the controlling or guard plates F F, are affixed to the frame A and do not move with the riddle-boxes. The motion which is given to the riddles B and cockle-screen D should be uniform—that is to say, all sudden jerking or thrusting must be avoided—otherwise the good grain will flow over the edges of the riddles and the oats and short straws pass through them in large quantities, thus defeating the operation of my machine with inclined riddles. When the motion of the riddles is regular, the oats, &c., which are intended to pass off over the riddles, do not escape through the perforations in the smooth surfaced riddle-plates, nor does the grain escape with the straw, sticks, &c., over the lower edges of the riddles, but a perfect separation is obtained when the grain, &c., has passed through the series of riddles, so that it is ready for the final operations of the screen and the blast to obtain it pure and clean when it is discharged from the machine. To secure this uniform movement we employ an eccentric, G, which is driven by the main shaft H. The eccentric consists of a circular disk with an annular groove in its periphery, which is embraced by the two semicircular bands $f\,f$ that are bolted together by the screw-bolts $g\ g$, Figs. 1 and 5. These bolts keep the band $f\,f$ in its place within the groove in the disk G, and allow this band to be clamped sufficiently tight around this disk, or, if desirable, to set up the two sections of the band in order to compensate for the wearing away of the parts. A cylindrical socket, $h$, on one of the sections $f$, is tapped to receive the male screw $h'$ on one end of a flat spring connecting-plate, J, which projects slightly upward, and may be connected at its other end rigidly to the ridge-beam $B^2$ of the middle riddle-box, as shown in Fig. 1 of the drawings, or a metallic washer or metallic rod, $b^2$, may be interposed between the beam $B^2$ and the end of the connecting-rod J, and the rod J riveted or otherwise rigidly connected to this rod $b^2$. The latter rod may extend longitudinally from end to end of the riddle-box, and be secured in its place by means of the nuts $i\ i$ on its ends. The rod $b^2$ may be independent of the beam $B^2$, and it, instead of the connecting-rod J, may be flexible or act as a spring. This rod, if made the spring, instead of the spring connecting-rod J, allows the eccentric to work freely when the extreme end of this rod is secured rigidly, and this spring also enables me to dispense with a hinged or pivot joint at its extreme end, which would be likely to wear loose. It will thus be seen that the eccentric G, hereinabove described, is specially applicable to my riddles for transmitting to them an even, uniform movement, which is not attended with that sudden jarring or thrusting of the riddles at either end of the stroke so injurious to the operation of the machine, and which will not cause the oats to fall through the riddles nor the grain to be thrown off the same.

The next part of my invention relates to the fan-box, from which I obtain the blast of air for separating the light from the heavy grain. This box is made of two semicylindrical sections, K K', united to their respective semicircular heads, $j\ j\ l\ l$. These two sections K K', when put together, form the fan-box, (shown in Figs. 1 and 4,) which is supported by the X-shaped brackets L, which are bolted to the end of the frame A. These brackets L also support the transverse fan-shaft N in journal-boxes $p\ p$, the lower portions of which are rigidly secured to the outside surfaces of the brackets, while the upper halves are bolted down over the shaft N in the usual manner. The axis of the shaft N is concentric with the cylindrical fan-box, and the fan-box is secured to the four arms of the brackets by the screws $r\ r$, the upper two of which can be removed at pleasure to allow the upper half of the fan-box to be removed when it is desired to get at the inside of the box. The curved mouth of the lower part of the fan-box has a sleeve-joint at $s$, where it unites with the main spout C, and by detaching the lower half of the fan-box from its bracket-arms, above described, this portion may also be removed when desired.

Having thus described our invention, what we claim as new, and desire to secure by Letters Patent, is—

1. The application of a rigid or flexible support, $b^2$, to grain-riddles, so that a connecting-rod, J, and an eccentric, G, within a closely-fitting strap, $f$, may be arranged and employed for operating the riddles, substantially as and for the purpose described.

2. The arrangement of the spring screw-rods $a'\ a'$, made adjustable, in combination with a rigid or flexible support, $b^2$, an eccentric, G, and a connecting-rod, J, all in the manner substantially as described, and so that the riddles may be adjusted without affecting the eccentric, as set forth.

3. The arrangement of the hinged devices F F in combination with a riddle which parts the grain at the center, and with a bottomless hopper placed over the ridge of the riddle, all in the manner substantially as described.

4. The combination of the many-armed bracket L and a fan-box, made with a horizontal joint and adapted to form a vertical junction with the blast-spout C, substantially as described.

Witness our hands in the matter of our application for a patent for improvements in grain-separators.

JAMES FARGUSSON.
CHAS. S. BURT.

Witnesses:
D. P. NOYES,
CHAS. M. WEATHERBY.